United States Patent
Thom et al.

(10) Patent No.: US 9,798,677 B2
(45) Date of Patent: Oct. 24, 2017

(54) HYBRID CRYPTOGRAPHIC KEY DERIVATION

(71) Applicant: Microsoft Technology Licensing, LLC, Redmond, WA (US)

(72) Inventors: Stefan Thom, Snohomish, WA (US); Daniel B. Shumow, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/521,953

(22) Filed: Oct. 23, 2014

(65) Prior Publication Data

US 2016/0117262 A1  Apr. 28, 2016

(51) Int. Cl.
*G06F 12/14* (2006.01)
*H04L 9/08* (2006.01)

(52) U.S. Cl.
CPC ........ *G06F 12/1408* (2013.01); *H04L 9/0822* (2013.01); *H04L 9/0825* (2013.01); *H04L 9/0894* (2013.01); *G06F 2212/1052* (2013.01); *H04L 2209/24* (2013.01)

(58) Field of Classification Search
CPC .................... G06F 21/72; G06F 2221/2107
USPC .................................................. 713/189, 193
See application file for complete search history.

(56) References Cited

U.S. PATENT DOCUMENTS

| | | | |
|---|---|---|---|
| 7,502,467 B2 | 3/2009 | Brainard et al. | |
| 8,009,829 B2 | 8/2011 | Jueneman et al. | |
| 8,370,638 B2 | 2/2013 | Duane et al. | |
| 8,494,168 B1 | 7/2013 | Tolfmans | |
| 8,572,410 B1* | 10/2013 | Tkacik | G06F 21/72 380/44 |
| 2002/0118836 A1* | 8/2002 | Howard | G06F 21/602 380/262 |
| 2004/0203591 A1* | 10/2004 | Lee | H04W 12/02 455/410 |
| 2008/0229114 A1* | 9/2008 | Okabe | G06F 21/57 713/189 |
| 2010/0131518 A1* | 5/2010 | Elteto | G06F 21/105 707/752 |
| 2010/0293332 A1 | 11/2010 | Krishnaprasad et al. | |
| 2012/0102334 A1* | 4/2012 | O'Loughlin | G06F 21/57 713/189 |
| 2013/0073850 A1* | 3/2013 | Zaverucha | H04L 9/0869 713/168 |

(Continued)

FOREIGN PATENT DOCUMENTS

| | | |
|---|---|---|
| JP | 2007116503 A | 5/2007 |
| WO | 2014138626 | 9/2014 |

OTHER PUBLICATIONS

Hoffman, "Towards an architecture for end-to-end-encrypted file synchronization systems", 2015, IEEE, p. 170-175.*

(Continued)

*Primary Examiner* — Taghi Arani
*Assistant Examiner* — Gregory Lane
(74) *Attorney, Agent, or Firm* — Wade IP Law LLC

(57) ABSTRACT

Cryptographic key management and usage is accomplished by employing a hybrid symmetric/asymmetric security context wherein seed values are associated with randomly generated cryptographic keys. A security context environment is maintained wherein cryptographic keys are reliably reproduced when needed.

20 Claims, 10 Drawing Sheets

(56) References Cited

U.S. PATENT DOCUMENTS

| | | | |
|---|---|---|---|
| 2013/0262881 A1* | 10/2013 | Garrard | G06F 21/6209 |
| | | | 713/193 |
| 2014/0208100 A1* | 7/2014 | Kendall | H04L 9/0863 |
| | | | 713/164 |
| 2014/0258736 A1 | 9/2014 | Merchan et al. | |
| 2015/0117640 A1* | 4/2015 | Park | H04L 9/0869 |
| | | | 380/44 |
| 2015/0244527 A1* | 8/2015 | Clayton | G09C 1/00 |
| | | | 713/189 |

OTHER PUBLICATIONS

"English Language Translation of Japanese Publication No. 2007116503", Publication Date: May 10, 2007, 19 Pages.

"International Search Report and Written Opinion Issued in PCT Application No. PCT/US2015/056120", Mailed Date: Mar. 16, 2016, 13 Pages.

"International Preliminary Report on Patentability Issued in PCT Application No. PCT/US2015/056120", Mailed Date: Jan. 24, 2017, 7 Pages.

"Second Written Opinion Issued in PCT Application No. PCT/US2015/056120", Mailed Date: Sep. 1, 2016, 6 Pages.

* cited by examiner

HYBRID CRYPTOGRAPHIC KEY DERIVATION

BACKGROUND

Cryptographic key derivation is a process used to generate one or more specific keys generally utilizing one or more Key Derivation Functions (KDFs). There are symmetric key derivation functions wherein one cryptographic key is generated and used to both encrypt and decrypt data with. There are also asymmetric key derivation functions, such as RSA and ECC, wherein two cryptographic keys, i.e., a cryptographic key pair, are generated: a first, public, key which is used to encrypt data with and a second, private, key which is utilized to decrypt previously encrypted data with.

There exists application programming interfaces (APIs), i.e., a set of programming instructions, that are employed in some security contexts of a computing device and execute as a KDF to provide, or otherwise support, functionality to generate an asymmetric cryptographic key pair. In these security contexts input is not utilized or otherwise associated with the generation of the cryptographic key pair and there is no reliance or expectation that the same key pair will be reproduced, or regenerated, upon subsequent execution of the same KDF, whether or not a same input is introduced. By the implicit randomness of the nature of these KDFs in these security contexts they will generate different key results upon subsequent executions, even if attempted to be initiated with the same initial, e.g., seed value, input parameter(s).

There further exists APIs that are employed in some other security contexts and execute as a KDF to provide, or otherwise support, functionality to generate a cryptographic key, or keys, also referred to herein simply as a key, directly from the system entropy, i.e., a seed value that is a random or pseudo-random number generated for system usage. In these security contexts the same key(s) can be repeatedly reliably reproduced, or regenerated, utilizing the same system entropy. In at least some of these other security contexts the same key is expected, and is relied upon, to be reproduced in order for the system cryptography to function properly.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methods for maintaining a hybrid security context wherein a randomly generated cryptographic key is associated with and protected by a system entropy value. Embodiments discussed herein include systems and methods for enabling a hybrid security context with the capability to reliably reproduce cryptographic keys for use in encrypting and decrypting data. Embodiments discussed herein further include systems and methods for the protection of system entropy and cryptographic key values within a hybrid security context.

BRIEF DESCRIPTION OF THE DRAWINGS

These and other features will now be described with reference to the drawings of certain embodiments and examples which are intended to illustrate and not to limit, and in which:

FIG. 9 depicts a block diagram of an exemplary computing device upon which embodiment hybrid security contexts and symmetric/asymmetric cryptographic key(s) can be implemented on and/or commanded from.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

In an embodiment a random key generation function that is not influenced by an input random, or pseudo-random, number, also referred to herein as a seed value, is leveraged to enable a symmetric/asymmetric key derivation functionality that can ostensibly reproducibly generate the same cryptographic key, also referred to herein as key, from identical input. In an embodiment a key generation function, also referred to herein as a KDF, associates a seed value with one or more cryptographic keys to support functionality that utilizes a seed value in an environment where cryptographic keys are generated without reliance upon a specific input.

Figure 1:
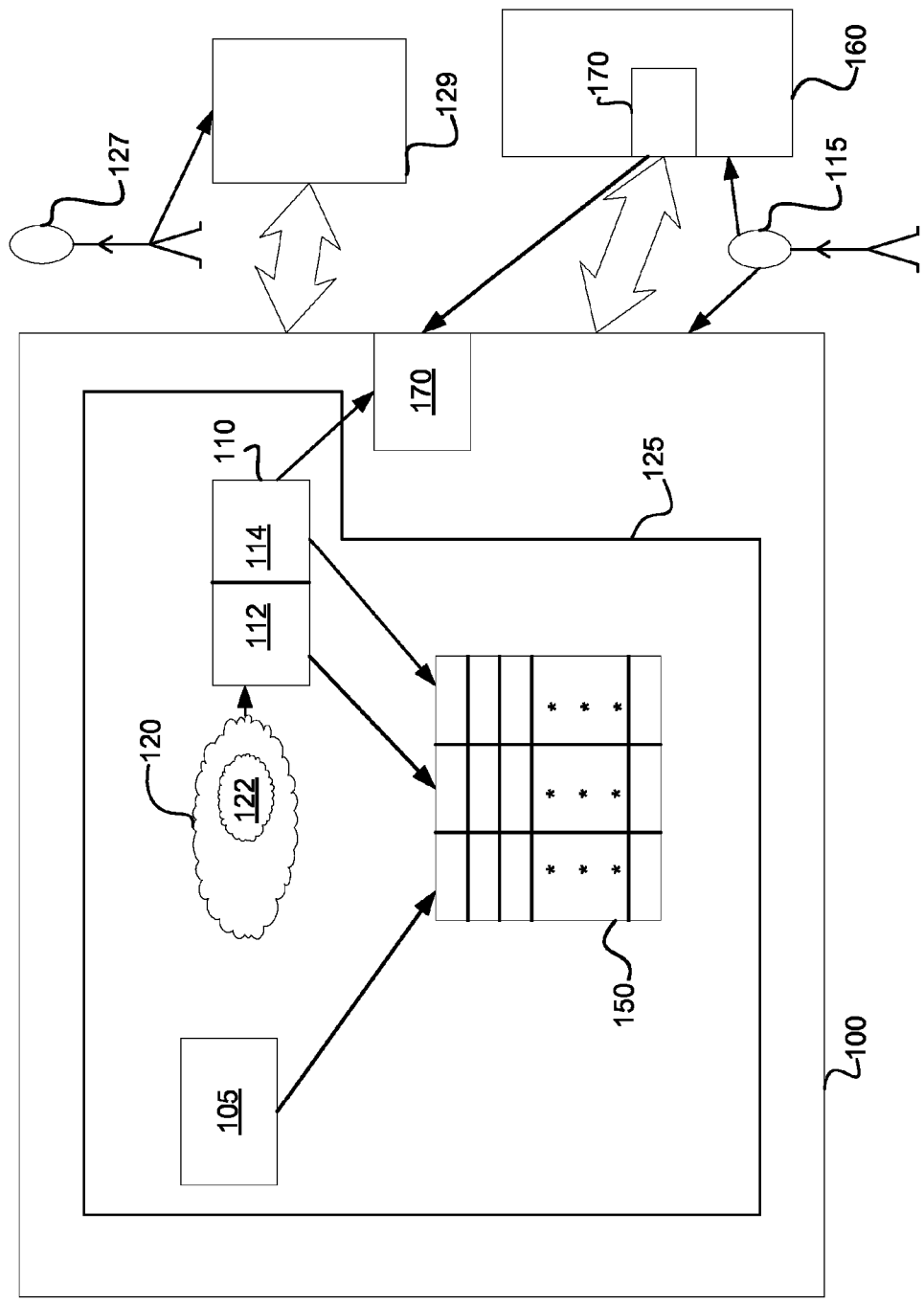
FIG. 1 depicts an embodiment computing device with an embodiment hybrid security context that supports cryptographic key derivation.

Referring to FIG. 1 one or more computing devices 100, collectively referred to herein as computing device 100, hosts embodiment systems and methodologies for cryptographic key derivations and usage. In embodiments a computing device 100 is any device or system of devices, i.e., computing device system, capable of computation, as further discussed below with reference to FIG. 9, including but not limited to, a computer, a computer network, an electronic notebook, a laptop, a netbook, mobile computing devices such as but not limited to a cell phone, a cell phone network, wearable computing devices, etc. In embodiments any device or system of devices capable of supporting the systems and methodologies discussed herein is a computing device 100.

In an embodiment the computing device 100 incorporates a security context 125 that utilizes one or more cryptographic keys 110 in order to protect a user's 115 data 170 from unauthorized attacks. Thus, in an embodiment one or more cryptographic keys 110 are utilized to encrypt and decrypt data 170 rendering the data 170 protected from unwanted and/or unwarranted users 127 or entities, e.g., other, unwarranted, computing devices, 129, collectively referred to herein as attackers 127. In an embodiment the functionality described herein for cryptographic key generation, maintenance and usage is designed to protect pertinent information involved in the cryptography from exposure outside the security context 125 of the computing device 100.

In an embodiment the security context 125 is a hybrid symmetric/asymmetric security context 125, also referred to herein as a hybrid security context 125.

In an embodiment a first key derivation function 120, also referred to herein as a KDF-ONE 120 and a cryptographic key production KDF 120, capable of deriving one or more keys 110 and/or key pairs 110 is executed when a cryptographic key 110 is to be generated. In an embodiment the KDF-ONE 120 is executed on the computing device 100. In an alternative embodiment the KDF-ONE 120 is executed on a different, second, computing device 160 and the derived key, or key pair, collectively hereafter referred to as key pair 110, is made accessible to the computing device 100.

In an embodiment the KDF-ONE 120 utilizes an asymmetric algorithm 122 to generate a public key 112, also referred to herein as an encryption cryptographic key 112, and a private key 114, also referred to herein as a decryption cryptographic key 114, that together are a key pair 110 for use in data 170 encryption and decryption. Asymmetric algorithms 122 that can be utilized by the KDF-ONE 120 include, but are not limited to, RSA and ECC (Elliptic Curve Cryptography).

In an embodiment a system entropy 105, i.e., a seed value 105, is generated on the computing device 100. In an alternative embodiment a seed value 105 is generated on a different, second, computing device, e.g., computing device 160, and is made accessible to the computing device 100. In an embodiment a seed value 105 is a number that is generated for system usage and, at least in part, is to be used for cryptographic key derivation. In an embodiment the seed value 105 is a random number. In an alternative embodiment the seed value 105 is a pseudo random number. In embodiments the seed value 105 is generated, or otherwise created, by the execution of a random number generator algorithm or a pseudo random number generator algorithm. In an embodiment a seed value 105 is a transient value that is generated when a predefined algorithm, or operation, is executed.

In embodiments the seed value 105 can be any size. In embodiments, the relatively larger the number of digits in the seed value 105 the greater the protection that is generally afforded to the cryptographic systems and methods discussed herein.

In embodiments the security context 125 associates the seed value 105 with the cryptographic key pair 110. Thus, in an embodiment the security context 125 assigns an association between a currently existing seed value 105 for the computing device 100 and one or more generated cryptographic keys 110 although the seed value 105 has not been utilized to generate the keys 110.

In an embodiment the seed value 105 is associated 150 with the public key 112 and the private key 114 generated by the KDF-ONE 120. In an embodiment, thereafter, whenever the seed value 105 is presented and data 170 is to be encrypted or decrypted the seed value 105 is utilized to identify the respective cryptographic key 112 or 114 to be used for the encryption or decryption. In an embodiment a search or look-up mechanism is utilized to identify the related key(s) 110 for a seed value 105.

Figure 2:
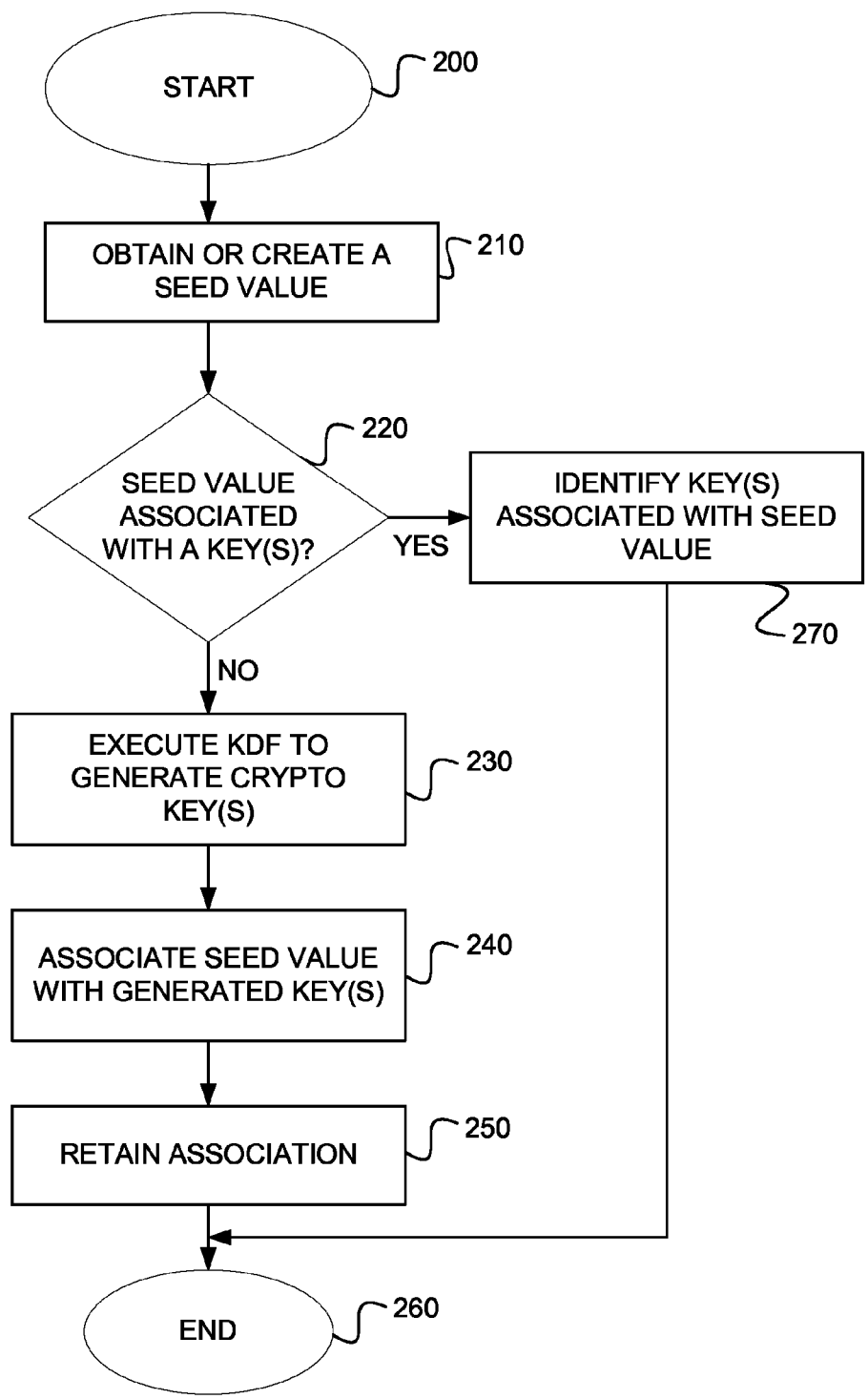
FIG. 2 depicts an embodiment top-level logic flow for hybrid cryptographic key derivation.

FIG. 2 illustrates an embodiment logic flow for functioning within the embodiment hybrid security context 125 of FIG. 1 wherein a seed value 105 is associated 150 with the output, i.e., key(s) 110, of a KDF, e.g., KDF-ONE 120. In an embodiment the KDF, e.g., KDF-ONE 120, generates one or more keys 110 randomly each time it is executed, i.e., each time the KDF is executed it will generate new key(s) with no regard or association to any prior key(s) it previously generated.

While the following discussion is made with respect to systems portrayed herein the operations described may be implemented in other systems. The operations described herein are not limited to the order shown. Additionally, in other alternative embodiments more or fewer operations may be performed.

Referring to FIG. 2 in an embodiment the logic flow starts 200 when data is to be encrypted or decrypted. In an embodiment a seed value is obtained, or alternatively, generated 210. In an embodiment at decision block 220 a determination is made as to whether the seed value is associated with one or more keys. Thus, in an embodiment, a determination 220 is made as to whether one or more cryptographic keys have already been generated and associated with the seed value. If yes, the previously generated key(s) are identified 270 and the process is ended 260.

If, however, at decision block 220 it is determined that the seed value is not currently associated with a cryptographic key(s), in an embodiment a KDF is executed to generate one or more cryptographic keys 230. In an embodiment the KDF-ONE 120 of FIG. 1 is executed. In an embodiment the execution of the KDF-ONE 120 results in the generation of a public key 112 and a private key 114 of a key pair 110.

In an embodiment the seed value is associated with the generated key(s) 240. In an embodiment the association between the seed value and the generated key(s) is retained 250 and the process is ended 260.

In an embodiment, as seen in FIG. 2, cryptographic key(s) 110 are generated once when a new seed value 105 is introduced to, or otherwise produced by, the computing system 100, and thereafter the seed value 105 is associated with the previously generated key(s) 110.

Figure 3:
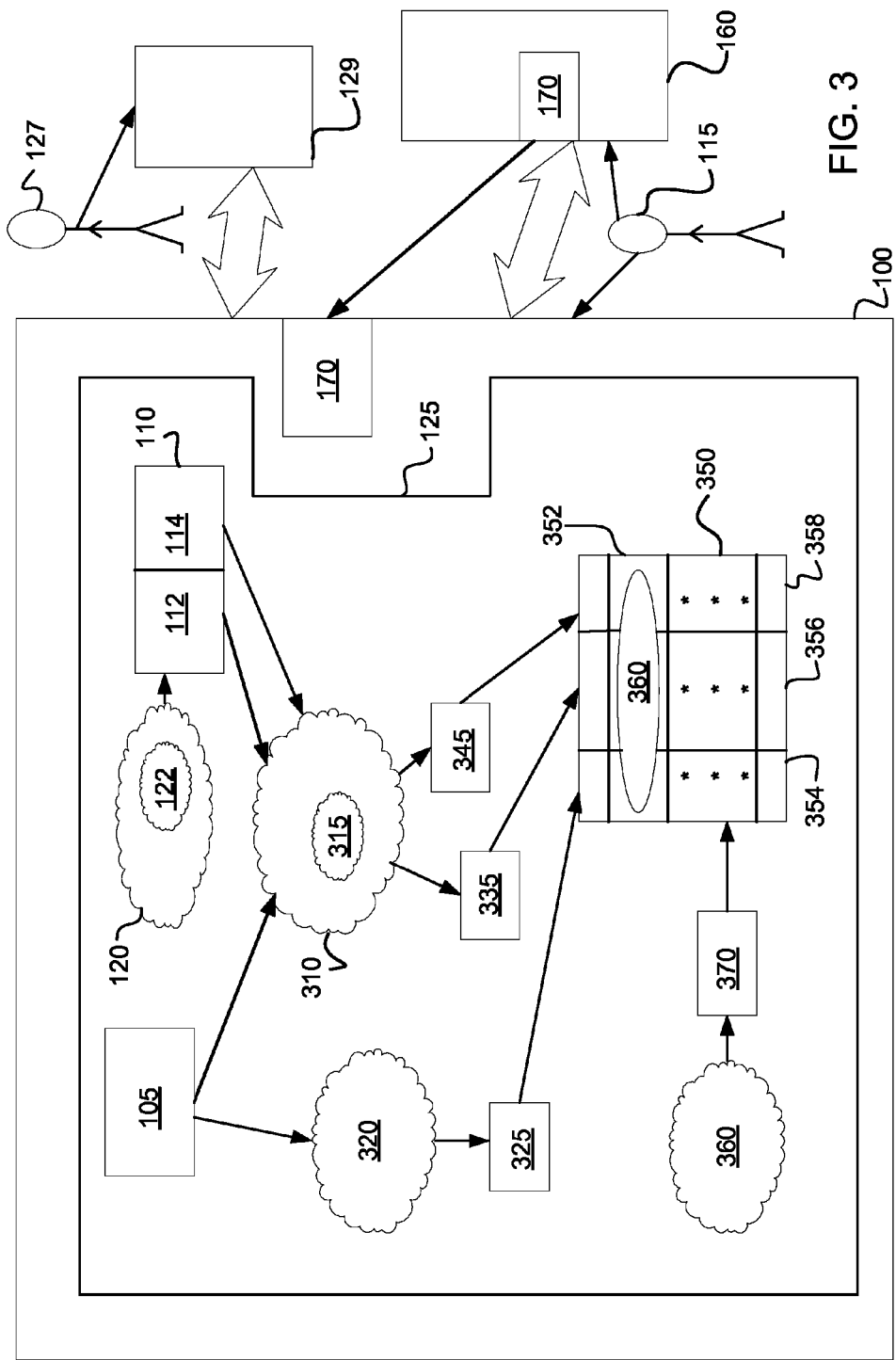
FIG. 3 depicts an embodiment computing device with an embodiment security context that supports hybrid cryptographic key derivation and protection.

In an embodiment computing system 100 and hybrid security context 125 the seed value 105 and generated key pair 110, and their association, is protected. In FIG. 1 a top level illustration of the security context 125 is described to explain the association of a seed value 105 and one or more generated cryptographic keys 110, i.e., collectively, key pair 110. Referring to FIG. 3, the computing system 100 and security context 125 are described in additional details to explain embodiment protections for the seed value 105 and the generated key pair 110.

Referring to FIG. 3 in an embodiment a second key derivation function, KDF-TWO, 310, also referred to herein as a cryptographic encapsulation KDF 310, is executed with a seed value 105 and at least one key 110 derived by the KDF-ONE 120 as inputs to the KDF-TWO 310. In an embodiment the KDF-TWO 310 is executed with the seed value 105 and the private key 114 as inputs to the KDF- TWO 310 and a blob, i.e., binary large object, 335 is generated thereby. In an embodiment the KDF-TWO 310 is also executed with the seed value 105 and the public key 112 as inputs to the KDF-TWO 310 and a second blob, i.e., second binary large object, 345 is generated thereby. In an alternative embodiment the KDF-TWO 310 is executed with the seed value 105, the public key 112 and the private key 114 as contemporary inputs to the KDF-TWO 310 and one blob, e.g., blob 335, is generated thereby.

In an embodiment the KDF-TWO 310 is executed on the computing device 100. In an alternative embodiment the KDF-TWO 310 is executed on an alternative computing device, e.g., computing device 160, and the output blob 335, and output blob 345 if generated in the embodiment, is thereafter made available to the computing device 100.

In an embodiment the KDF-TWO 310 utilizes a symmetric encryption algorithm 315 to generate a blob 335 utilizing a seed value 105 and a private key 114. In an embodiment the KDF-TWO 310 utilizes a symmetric encryption algorithm 315 to generate a second blob 345 utilizing a seed value 105 and a public key 112. In an alternative embodiment the KDF-TWO 310 utilizes a symmetric encryption algorithm 315 to generate a blob 335 utilizing a seed value 105, a public key 112 and its related private key 114.

In an embodiment subsequent to generation of a blob 335 the underlying cryptographic key(s) 110 is (are) no longer maintained on the computing device 100, and thus neither a user 115 nor an attacker 127 can discover the underlying cryptographic key(s) 110 on the computing device 100.

In an embodiment subsequent to generation of the blob 345 the underlying cryptographic key, e.g., public key 112, is no longer maintained on the computing device 100, and thus neither a user 115 nor an attacker 127 can discover the underlying cryptographic key 110 on the computing device 100.

In alternative embodiments the KDF-TWO 310 utilizes other algorithms 315 for generating a number, e.g., a blob, that support the same output number being generated upon execution of the KDF-TWO 310 with the same inputs.

In an embodiment the seed value 105 is modified, altered or changed, or otherwise encrypted, itself by the execution of a function 320, and a second value, referred to herein as a digested seed value, 325 is generated. In an aspect of this embodiment the seed value 105 is an input to a one-way function 320, such as, but not limited to, a hash function or a cryptographic hash function, and a digested seed value 325 is generated thereby. In an embodiment, the one-way function 320 utilized is designed to render it difficult for an attacker 127 to recreate the seed value 105 from the resultant digested seed value 142.

In an embodiment the seed value 105 is not maintained on the computing device 100 subsequent to the creation of the digested seed value 325. In an alternative embodiment the seed value 105 is not accessible outside the computing system 100 and/or the computing system's security context 125.

In an embodiment the digested seed value 325 is associated with the blob 335 that is generated utilizing the same seed value 105 and this blob 335 is identified as its related blob 335. In an embodiment where a second blob 345 is generated the digested seed value 325 is associated with the second blob 345 that is generated utilizing the same seed value 105 and this second blob 345 is identified as its related second blob 345.

In an embodiment the digested seed value 325 and its related blob 335 are stored as associated data 360 in a storage container 350, also referred to herein as a cache 350.

In an embodiment where a second blob 345 is generated the digested seed value 325, its related blob 335 and its related second blob 345 are stored as associated data 360 in the cache 350.

In an embodiment the cache 350 is hosted on the computing device 100. In another embodiment the cache 350 can be hosted on another computing device 160 that is accessible to the computing device 100.

In an embodiment the format of the cache 350 is a table containing entries 352 of related stored digested seed values 354, stored blobs 356, and if generated in the embodiment, stored second blobs 358. The stored blobs 356 are the related blobs 335 and the stored second blobs 358 are the related second blobs 345. In an aspect of this embodiment the table is a look-up table.

In alternative embodiments the format of the cache 350 is other database formats that support the retainment of entries 352 of stored digested seed values 354 and stored related blobs 356, and, in embodiments where related second blobs 345 are generated, stored related second blobs 358, including but not limited to linked lists.

In an embodiment, the generation and storage of a digested seed value 325, the related blob 335 and the second related blob 345 protects the seed value 105, the associated public key 112 and the associated private key 114 from exposure outside the security context 125 of the computing device 100, and outside the computing device 100 itself.

In an embodiment a digested seed value 325 that is generated from the same seed value 105 but in two separate security contexts 125, e.g., on two separate computing devices, e.g., computing device 100 and a computing device 160, will generally be a different number in the two separate security contexts 125. This is due to the random generation of a digested seed value 325 on any particular computing device 100 or 160 via the execution of the one-way function 320 executing on the unique computing device 100 or 160. Thus, in an embodiment a digested seed value 325 generated by the execution of the one-way function 320 on computing device 100 with a seed value 105 as input will have the resultant same value each time the digested seed value 325 is generated. In this embodiment a digested seed value 325 generated by the execution of the one-way function 320 with the same seed value 105 as input but on a different, second, computing device 160 will generally have a different value than the value of the digested seed value 325 generated on the computing device 100.

In an embodiment therefore computing devices 100 and 160 each have access to the execution of the one-way function 320 and the cache 350 on the same computing device 100 or 160. For example, in an embodiment when the one-way function 320 executes on computing device 100 and the cache 350 is hosted on computing device 100 and a user 115 utilizes both computing device 100 and computing device 160 to encrypt and/or decrypt data 170, computing device 160 is provided access to computing device 100 in order to execute the one-way function 320 and access the cache 350 as described herein with, e.g., regard to the decryption of data 170.

Figure 4:
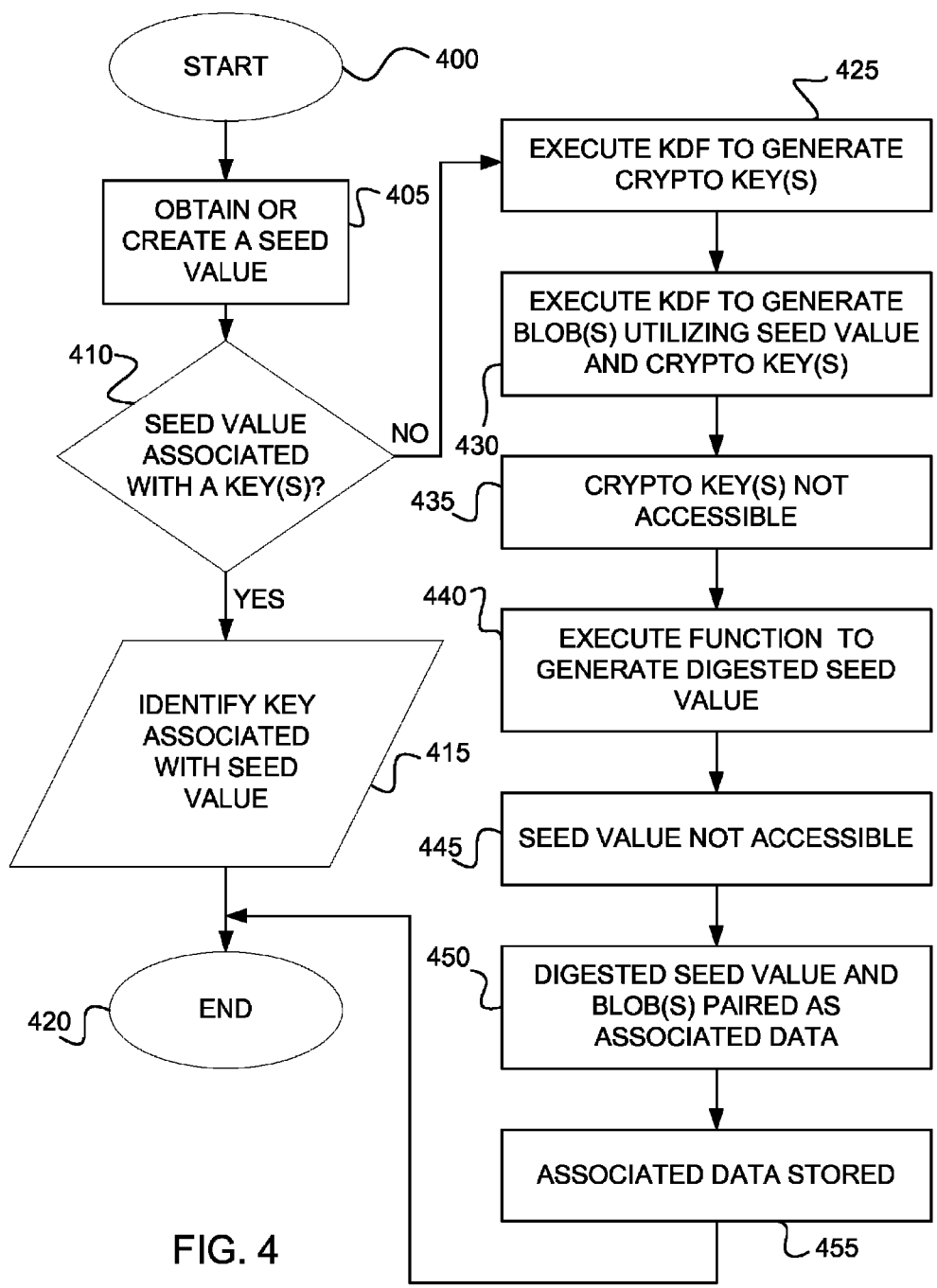
FIG. 4 depicts an embodiment logic flow for generating and protecting key pairs associated with seed values within an embodiment hybrid security context.

FIG. 4 illustrates an embodiment logic flow for generating and protecting key pairs 110 associated with seed values 105 within the embodiment security context 125 of FIGS. 1 and 3.

While the following discussion is made with respect to systems portrayed herein the operations described may be implemented in other systems. The operations described herein are not limited to the order shown. Additionally, in other alternative embodiments more or fewer operations may be performed.

Referring to FIG. 4 in an embodiment the logic flow starts 400 when a cryptographic key(s) is to be produced and/or utilized. In an embodiment a seed value is obtained or generated 405. In an embodiment at decision block 410 a determination is made as to whether the seed value is associated with one or more keys. Thus, in an embodiment, a determination 410 is made as to whether one or more cryptographic keys have already been generated and associated with the seed value. If yes, the previously generated key(s) are identified 415 in a process that is described with reference to FIGS. 8A-8B herein, and the process described with reference to FIG. 4 is ended 420.

If, however, at decision block 410 it is determined that the seed value is not currently associated with a cryptographic key(s), in an embodiment a KDF is executed to generate one or more cryptographic keys 425. In an embodiment the KDF-ONE 120 of FIG. 3 is executed. In an embodiment the execution of the KDF-ONE 120 results in the generation of a public key 112 and a private key 114 of a key pair 110.

In an embodiment a second KDF is executed to generate one or more blobs 430. In an embodiment the KDF-TWO 310 of FIG. 3 is executed. As discussed with regards to FIG. 3, in an embodiment the KDF-TWO 310 is executed with a seed value 105 and the private key 114 of the key pair 110 as inputs and a blob, binary large object, 335 as an output. In an embodiment the KDF-TWO 310 is also executed with the seed value 105 and the public key 112 of the key pair 110 as inputs and a second blob 345 as an output. In an alternative embodiment the KDF-TWO 310 is executed with the seed value 105, the private key 114 and the public key 112 of a key pair 110 as contemporaneous inputs and a blob 335 as an output. Thus, in an embodiment the seed value is associated with the generated key(s) 430.

In an embodiment subsequent to generation of the blob(s) the underlying cryptographic key(s) is (are) no longer maintained on the computing device, or are otherwise inaccessible outside the computing device's security context and/or the computing device 435.

In an embodiment the seed value is modified, altered or changed, or otherwise encrypted, itself by the execution of a function, and a second value, referred to herein as a digested seed value, is generated 440. In an aspect of this embodiment, and referring to FIG. 3, the seed value 105 is an input to a one-way function 320 and a digested seed value 325 is generated thereby.

In an embodiment subsequent to generation of the digested seed value the seed value is no longer maintained on the computing device, or is otherwise inaccessible outside the computing device's security context and/or the computing device 445.

In an embodiment the digested seed value, the blob, and when generated the second blob, are associated as associated data 450.

In an embodiment the associated data is stored, or otherwise retained, in data storage, e.g., a cache, 455 and the process is ended 420.

Referring again to FIG. 3, in an embodiment to heighten the difficulty of potential attacks on the cache 350 a computing device 100 creates a number, e.g., one (1), one-hundred (100), etc., of decoy data collections 370 that are then stored in the cache 350 in entries 352. Increasing the number of entries 352 in the cache 350 creates additional difficulty for an attacker 127 to attempt to identify valid associated data 360 of a stored digested seed value 354 and stored key blob(s) 356 and, when generated and stored, 358.

In an embodiment a decoy data collection 370 is a decoy, i.e., not valid and/or unused, digested seed value, a decoy blob, and in embodiments where second blobs 345 are generated, a decoy second blob. In an embodiment a decoy digested seed value is stored as a stored digested seed value 354 in an entry 352 of the cache 350. In an embodiment a decoy blob is stored as a stored blob 356 in the same entry 352 of the cache 350 as the decoy digested seed value of the decoy data collection 370. In an embodiment a decoy second blob is stored as a stored second blob 358 in the same entry 352 of the cache 350 as the decoy digested seed value and decoy blob of the decoy data collection 370.

In an embodiment the number of generated decoy data collections 370 can be any amount that allows for the creation and storage of decoy data collections 370 but does not result in the population of the cache 350 in such a manner that the cache 350 becomes full with no more room for any more entries 352. If there is no room for any additional entries 352 after the creation of a number of decoy data collections 370 there will be no room in the cache 350 for any additional valid associated data 360 that may subsequently be created. Additionally, in an embodiment a full cache 350 can potentially become more vulnerable to an attacker 127 than a cache 350 whose entries 352 are not completely filled up.

In an embodiment a decoy data collection 370 is generated by employing a random number and/or pseudo random number generator algorithm 360 to create the decoy digested seed value, decoy blob, and in embodiments, decoy second blob. In an embodiment the computing device 100 generates the decoy data collection(s) 370 and stores it as associated data 360. In an alternative embodiment the decoy data collection(s) 370 are generated by a second computing device, e.g., computing device 160, and thereafter rendered accessible to the computing device 100.

Figure 5:
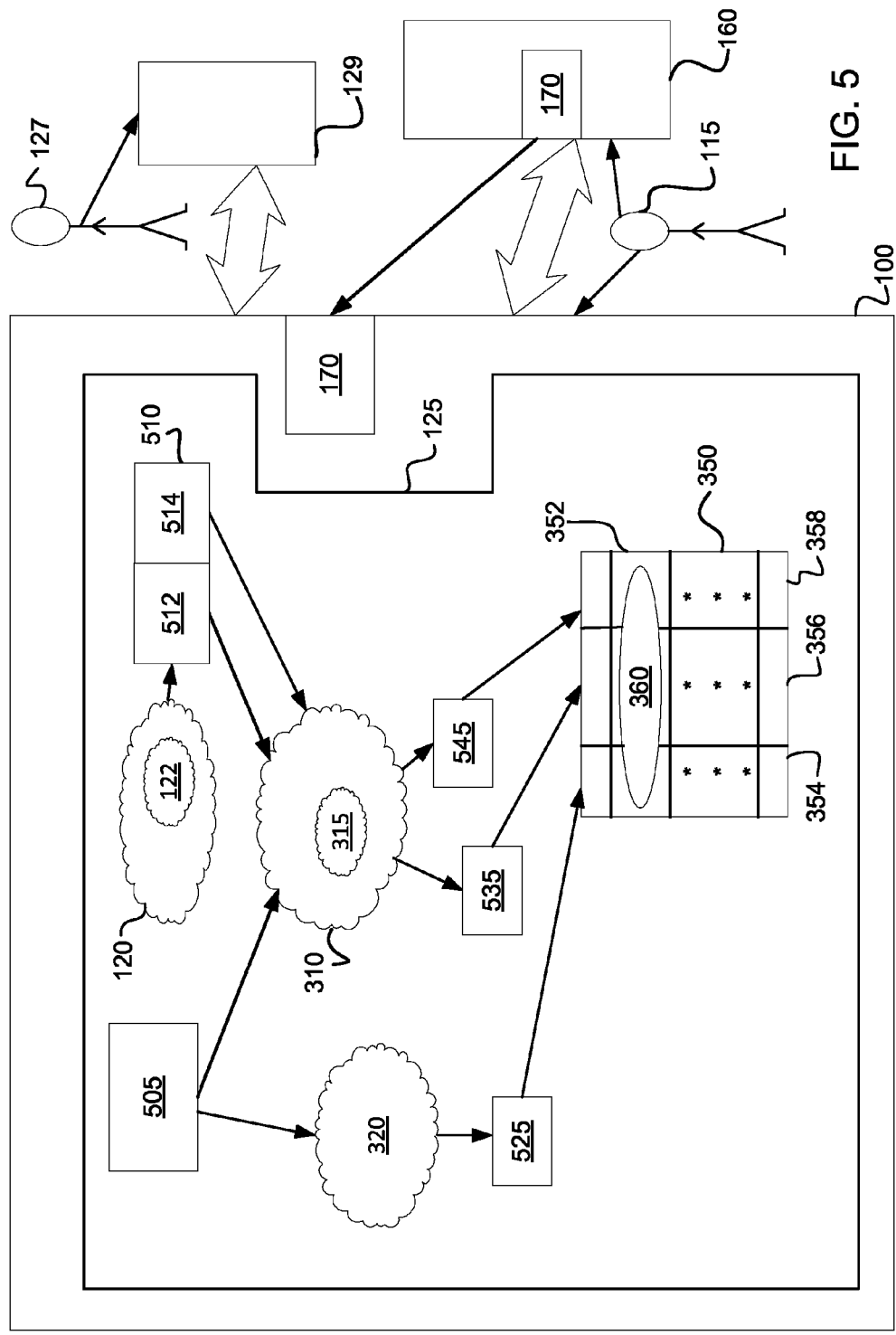
FIG. 5 depicts an embodiment hybrid security context that supports an embodiment methodology for generating a decoy key pair of one or more cryptographic keys.

In an alternative embodiment a decoy data collection 370 is generated in the same basic manner as valid associated data 360 as described with regard to FIG. 3. Referring to FIG. 5, in this alternative embodiment the KDF-ONE 120 is executed to generate a decoy, i.e., invalid and/or unused, key pair 510 of one or more keys. In this alternative embodiment a decoy seed value 505 is generated or otherwise obtained. In this alternative embodiment the KDF-TWO 310 is executed with the decoy seed value 505 and the decoy key pair 510 as inputs and a decoy blob 535, and in aspects of this alternative embodiment a decoy second blob 545, as outputs.

In this alternative embodiment the decoy seed value 505 is modified, altered or changed, or otherwise encrypted, itself by the execution of a function 320, and a second value, referred to herein as a decoy digested seed value, 525 is generated. In this alternative embodiment the decoy digested seed value 525, the decoy blob 535, and in aspects of this alternative embodiment the decoy second blob 545, which collectively are a decoy data collection 370, are stored in the same format as associated data 360 in the cache 350.

Figure 6:
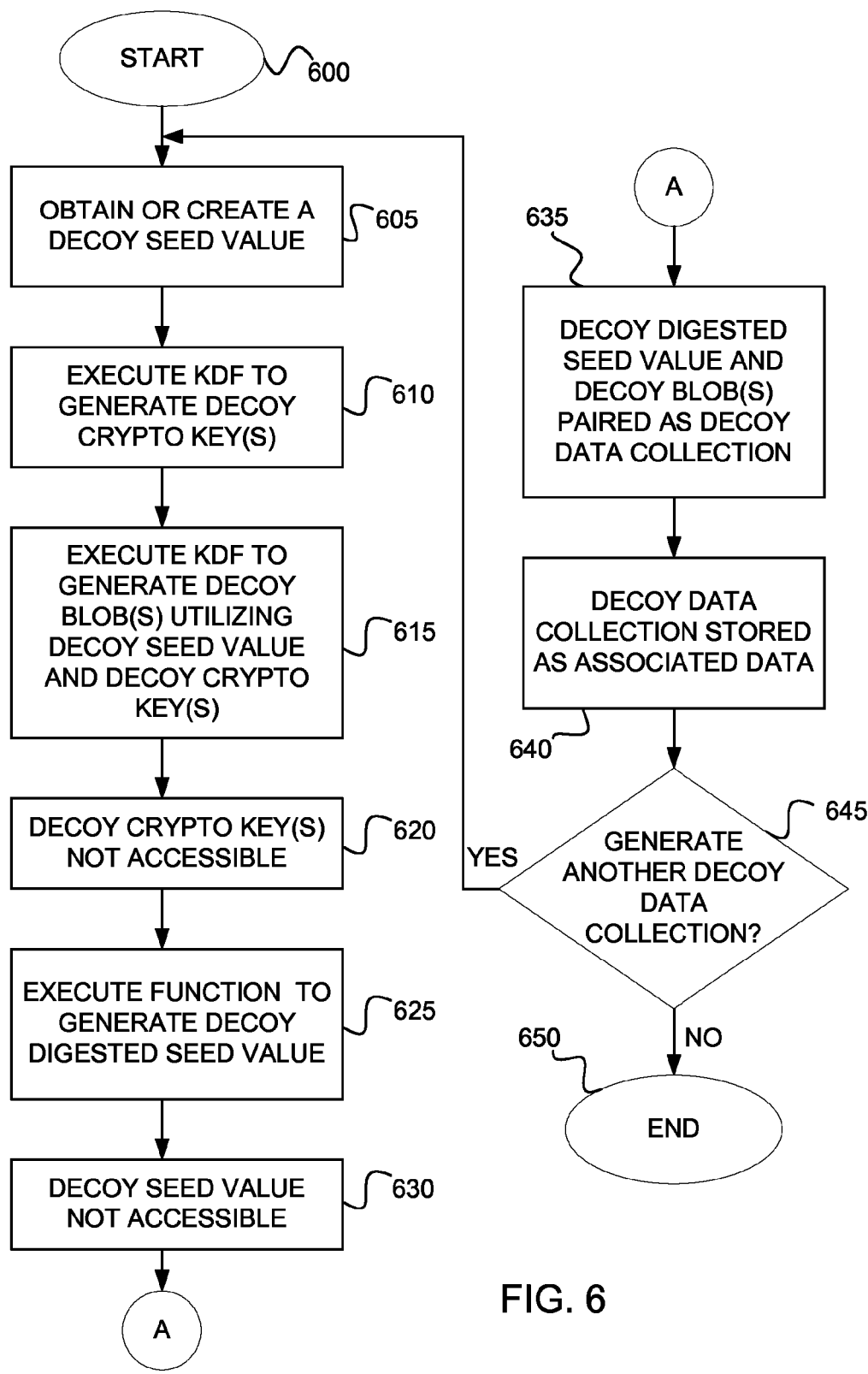
FIG. 6 depicts an embodiment logic flow for generating a decoy key pair.

FIG. 6 illustrates an embodiment logic flow for generating decoy data collection(s) 370 within the embodiment security context 125 of FIG. 5.

While the following discussion is made with respect to systems portrayed herein the operations described may be implemented in other systems. The operations described herein are not limited to the order shown. Additionally, in other alternative embodiments more or fewer operations may be performed.

Referring to FIG. 6 in an embodiment the logic flow starts 600 when one or more decoy data collections are to be generated. In an embodiment a decoy seed value is obtained, or alternatively, generated 605. In an embodiment a KDF is executed to generate one or more decoy cryptographic keys 610. In an embodiment the KDF-ONE 120 of FIG. 5 is executed. In an embodiment the execution of the KDF-ONE 120 results in the generation of a decoy public key 512 and a decoy private key 514 of a decoy key pair 510.

In an embodiment a second KDF is executed to generate one or more decoy blobs 615. In an embodiment the KDF-TWO 310 of FIG. 5 is executed. As discussed with regards to FIG. 5, in an embodiment the KDF-TWO 310 is executed with a decoy seed value 505 and the decoy private key 514 of the decoy key pair 510 as inputs and a decoy blob 535 as an output. In an embodiment the KDF-TWO 310 is also executed with the decoy seed value 505 and the decoy public key 512 of the decoy key pair 510 as inputs and a decoy second blob 545 as an output. In an alternative embodiment the KDF-TWO 310 is executed with the decoy seed value 505, the decoy private key 514 and the decoy public key 512 of a decoy key pair 510 as contemporaneous inputs and a decoy blob 535 as an output. Thus, in an embodiment the decoy seed value is associated with the decoy generated key(s) 615.

In an embodiment subsequent to generation of the decoy blob(s) the underlying decoy cryptographic key(s) is (are) no longer maintained on the computing device, or are otherwise inaccessible outside the computing device's security context and/or the computing device 620.

In an embodiment the decoy seed value is modified, altered or changed, or otherwise encrypted, itself by the execution of a function and a decoy digested seed value is generated 625. In an aspect of this embodiment, and referring to FIG. 5, the decoy seed value 505 is an input to a one-way function 320 and a decoy digested seed value 525 is generated thereby.

In an embodiment subsequent to generation of the decoy digested seed value the decoy seed value is no longer maintained on the computing device, or is otherwise inaccessible outside the computing device's security context and/or the computing device 630.

In an embodiment the decoy digested seed value, the decoy blob, and when generated the decoy second blob, are associated as a decoy data collection 635.

In an embodiment the decoy data collection is stored, or otherwise retained, as associated data in data storage, e.g., a cache, 640.

In an embodiment at decision block 645 a determination is made as to whether another decoy data collection is to be generated. If yes, the embodiment process repeats itself for a new data collection by obtaining, or alternately generating, a decoy seed value 605.

If at decision block 645 it is determined that no additional decoy data collections are to be generated, at least at this time, the process ends 650.

Figure 7:
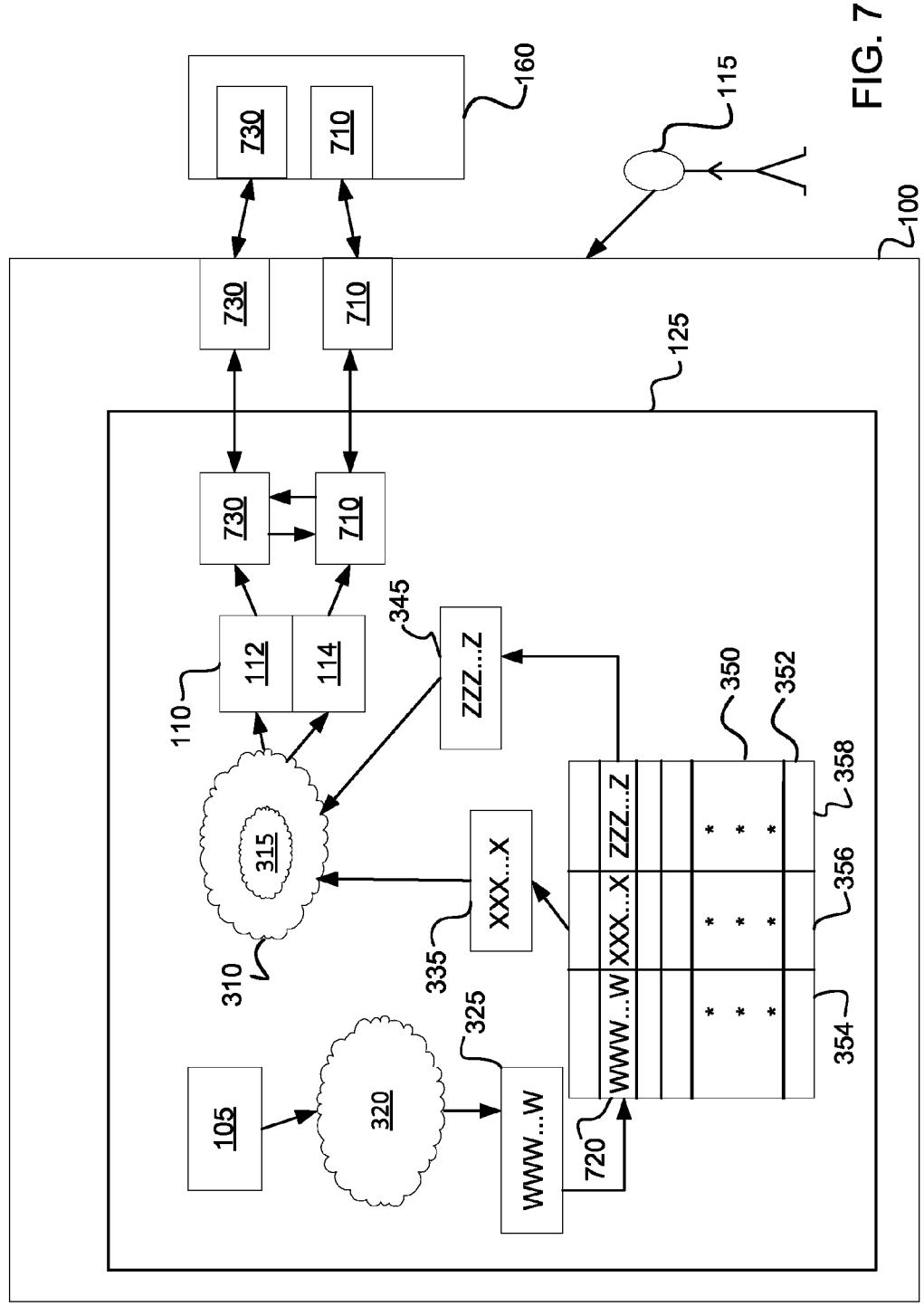
FIG. 7 depicts an embodiment hybrid security context supporting exemplary data encryption and data decryption utilizing symmetric/asymmetric cryptographic key(s).

In an embodiment, and referring to FIG. 7, a user 115 can receive encrypted data 710 on a computing device 100 or 160 that they are utilizing. In an embodiment a computing device 100 or 160 itself can receive, or otherwise gain access to, encrypted data 710 to be decrypted.

For simplicity of discussion computing devices 100 and 160 are collectively referred to as computing device 100 for purposes of the discussion of FIG. 7. However, in an embodiment operations discussed herein with reference to the decryption of encrypted data can be performed on one computing device, e.g., computing device 100, and the output can be made accessible to a second computing device, e.g., a computing device 160 that a user 115 is operating upon at any given time. Moreover, in an embodiment operations discussed herein with reference to the decryption of encrypted data can be performed on multiple computing devices, e.g., some operations can be performed on computing device 100 while other operations are performed on a different computing device(s) 160.

In an embodiment when there is encrypted data 710 to be decrypted the seed value 105 is retrieved, obtained, or otherwise re-generated. In an embodiment the seed value 105 is modified, altered, or changed, or otherwise encrypted, itself by the execution of the function 320 and a digested seed value 325 is generated.

In an embodiment the data cache 350 is searched with the digested seed value 325 and if a match is found, e.g., match 720, the related stored key blob 356 is retrieved, and thus the related key blob 335 is retrieved, or otherwise identified. In an embodiment as only one key, e.g., the private key 114, is utilized to decrypt encrypted data 710, the second key blob 345 is not retrieved from the cache 350 when encrypted data 710 is to be decrypted.

In an embodiment the KDF-TWO 310 is executed with the seed value 105 and the key blob 335 as inputs to the KDF-TWO 130 in order to, in this event, decrypt the previously encrypted key that the computing system 100 can then use to decrypt the encrypted data 710 with. In an aspect of this embodiment the KDF-TWO 130 is executed with the seed value 105 and the key blob 335 as inputs to the KDF-TWO 130, wherein the seed value 105 is utilized to decrypt the key blob 335. In an embodiment upon execution of the KDF-TWO 130 the original private key 114 is regenerated.

In an embodiment the regenerated, or reconstituted, private key 114 can be used by the computing device 100 to decrypt the encrypted data 710 and the subsequent decrypted data 730 can be provided, or otherwise made accessible, to the user 115 or otherwise utilized as warranted.

In an embodiment when the cache 350 is searched with a digested seed value 325 and a match is not found in the cache 350 then either the computing system 100 does not have a previously created entry 352 stored in the cache 350 for the seed value 105 or, alternatively, there is an attempted unwarranted attack on the computing system 100. In an embodiment when the cache 350 is searched with a digested seed value 325 and a match is not found in the cache 350 then the computing system 100 executes the process flow as described with reference to FIG. 4 to generate associated data 360 of a digested seed value 325 generated from the seed value 105 currently being utilized and a key blob 335 generated from the currently utilized seed value 105 and at least one cryptographic key 110. In an embodiment in this event a second key blob 345 is also generated.

In an embodiment the associated data 360 that is newly created is stored in the cache 350. In an embodiment the key to be used to decrypt encrypted data 710, e.g., the private key 114, that has been newly generated is utilized to attempt to decrypt the encrypted data 710. However, as the key to be used for decryption has been newly generated it should not be successful in decrypting the encrypted data 710.

In an embodiment, and also referring to FIG. 7, a user 115 can have access to data 730 on a computing device 100 they are utilizing that is to be encrypted. In an embodiment a computing device 100 or 160 itself can receive, or otherwise gain access to, data 730 that is to be encrypted.

In an embodiment, when there is data 730 to be encrypted the seed value 105 is retrieved, obtained, or otherwise re-generated. In an embodiment the seed value 105 is modified, altered, or changed, or otherwise encrypted, itself by the execution of the function 320 and a digested seed value 325 is generated.

In an embodiment the data cache 350 is searched with the digested seed value 325 and if a match is found, e.g., match 720, the related stored key blob 356 is retrieved, and thus the related key blob 335 is retrieved, or otherwise identified. In an embodiment where a second key blob 345 was previously generated and stored as associated data 360, the related second stored key blob 358 is retrieved and thus the related second key blob 345 is retrieved, or otherwise identified. In an embodiment as only one key, e.g., the public key 112, is utilized to encrypt data 730 the key blob 335 is not retrieved from the cache 350 when there is a stored second key blob 358 in the cache for the entry 352 containing the digested seed value 325 match 720.

In an embodiment the KDF-TWO 310 is executed with the seed value 105 and the key blob 335, or in the embodiment where a second key blob 345 exists the second key blob 345, as inputs to the KDF-TWO 130 in order to, in this event, decrypt the previously encrypted key that the computing system 100 can then use to encrypt the data 730. In an aspect of this embodiment the KDF-TWO 130 is executed with the seed value 105 and the key blob 335, or in the embodiment where a second key blob 345 exists the second key blob 345, as inputs, wherein the seed value 105 is utilized to decrypt the key blob 335, or second key blob 345. In an embodiment in this scenario upon execution of the KDF-TWO 130 the original public key 112 is regenerated.

In an embodiment the regenerated public key 112 can be used by the computing device 100 to encrypt the data 730 and generate encrypted data 710 to then be utilized, e.g., transmitted, etc., as warranted.

In an embodiment when the cache 350 is searched with a digested seed value 325 and a match is not found then either the computing system 100 does not have a previously created entry 352 stored in the cache 350 for the seed value 105 or, alternatively, there is an attempted unwarranted attack on the computing system 100. In an embodiment when the cache 350 is searched with a digested seed value 325 and a match is not found then the computing system 100 executes the process flow as described with reference to FIG. 4 to generate associated data 360 of a digested seed value 325 generated from the seed value 105 currently being utilized and a key blob 335 generated from the currently utilized seed value 105 and at least one cryptographic key 110. In an embodiment in this event a second key blob 345 is also generated.

In an embodiment the associated data 360 that is newly created is stored in the cache 350. In an embodiment the key to be used to encrypt data 170, e.g., the public key 112, that has been newly generated is utilized to encrypt the data 170 and generate decrypted data 710.

In an embodiment each time a seed value 105 is obtained, or otherwise accessed or generated, the process flow described with regard to FIG. 7 is performed. Thus, each time a seed value 105 is obtained, or otherwise accessed or generated, a digested seed value 325 is generated using the seed value 105 and the resultant digested seed value 325 is used to search the cache 350. If a match is found then an associated key, or key pair, 110 for the current seed value 105 has previously been generated. If, however, no match is found a key, or key pair, 110 is generated and associated with the current seed value 105 and the resultant associated data 360 that is created is stored in the cache 350.

In embodiments various mechanisms can be utilized to store associated data 360 and decoy data collections 370 in the cache 350. Such mechanisms include, but are not limited to, storing associated data 360 and decoy data collections 370 in sequential order as they are generated, storing associated data 360 and decoy data collections 370 in some numerical order based on the value of the digested seed value 325 or decoy digested seed value 525, such as, but not limited to, basic numerical order, numerical order of the last x digits in the digested seed value 325 or decoy digested seed value 525, numerical order of the first y digits in the digested seed value 325 or decoy digested seed value 525, etc., etc.

Figure 8A:
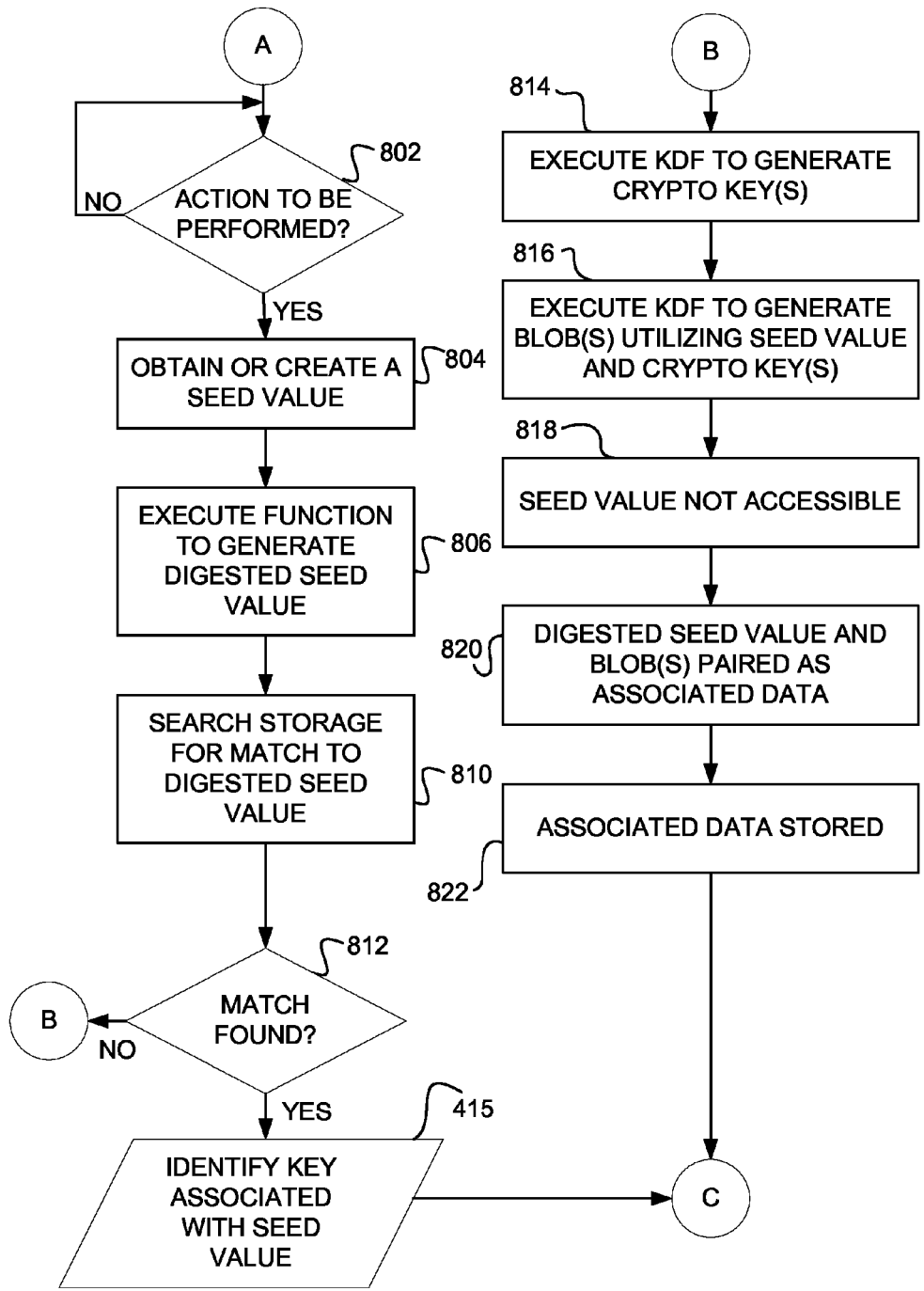
FIGS. 8A-8B depict an embodiment logic flow for identifying a prior generated cryptographic key(s) and reconstituting the cryptographic key(s), generating cryptographic key(s) and providing a protected association of the cryptographic key(s) with a seed value, and encrypting and decrypting data with symmetric/asymmetric cryptographic key(s).
Figure 8B:
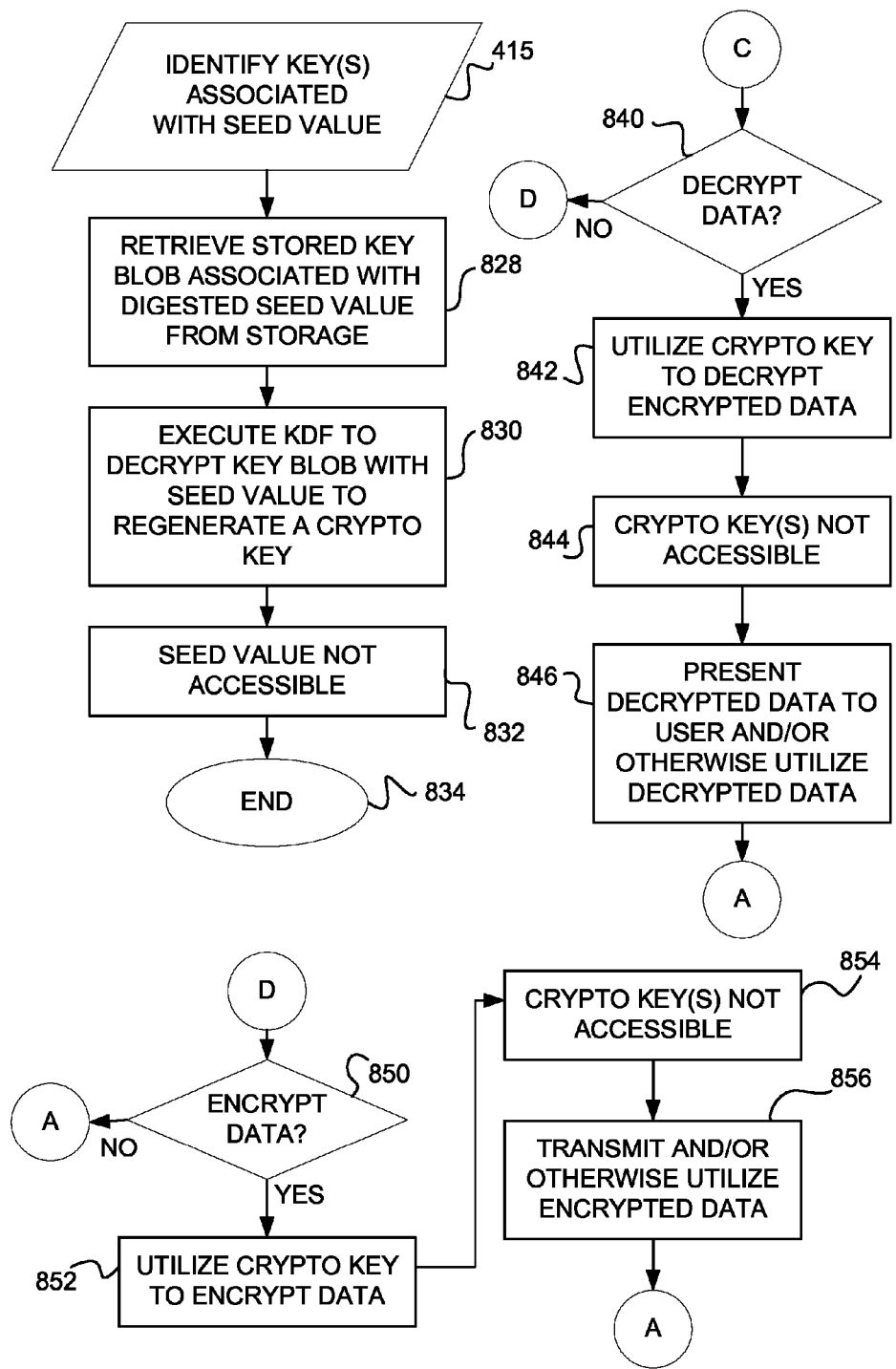

FIGS. 8A-8B illustrate an embodiment logic flow for the process 415 of identifying existing key(s) associated with a seed value 105 of FIG. 4 and described in detail with reference to FIG. 7. FIGS. 8A-8B further illustrate an embodiment logic flow for generating cryptographic key(s) to be utilized to encrypt and decrypt data as discussed with reference to FIG. 7.

While the following discussion is made with respect to systems portrayed herein the operations described may be implemented in other systems. The operations described herein are not limited to the order shown. Additionally, in other alternative embodiments more or fewer operations may be performed.

Referring to FIG. 8A in an embodiment at decision block 802 a determination is made as to whether there is an action to be performed, e.g., whether there is data to be encrypted, whether there is data to be decrypted, whether a seed value is presented, or otherwise generated or obtained, for use. If no action is to be performed at the time in an embodiment the process remains waiting until an action is to be performed 802.

In an embodiment, if it is determined at decision block 802 that an action is to be performed a seed value is obtained or otherwise created 804. In an embodiment the seed value is modified, altered or changed, or otherwise encrypted, itself by the execution of a function and a second value, i.e., a digested seed value, is generated 806. In an aspect of this embodiment, and referring to FIG. 3, the seed value 105 is an input to a one-way function 320 and a digested seed value 325 is generated thereby.

In an embodiment the digested seed value is used to search storage, e.g., a cache, to see if it is stored therein 810. In an embodiment if a match, e.g., match 720, is found in storage 350 for the digested seed value 325 then the seed value 105 has previously been associated with an existing key pair 110. In an embodiment if a match is not found for the digested seed value 325 in the cache 350 then the seed value 105 is not associated with a cryptographic key(s) 110.

In an embodiment at decision block 812 a determination is made as to whether a match is found for the digested seed value in the storage. If no, in an embodiment a KDF is executed to generate one or more cryptographic keys 814. In an embodiment the KDF-ONE 120 of FIG. 3 is executed. In an embodiment the execution of the KDF-ONE 120 results in the generation of a public key 112 and a private key 114 of a key pair 110.

In an embodiment a second KDF is executed to generate one or more blobs 816. In an embodiment the KDF-TWO 310 of FIG. 3 is executed. As discussed with regards to FIG. 3, in an embodiment the KDF-TWO 310 is executed with a seed value 105 and the private key 114 of the key pair 110 as inputs and a blob 335 as an output. In an embodiment the KDF-TWO 310 is also executed with the seed value 105 and the public key 112 of the key pair 110 as inputs and a second blob 345 as an output. In an alternative embodiment the KDF-TWO 310 is executed with the seed value 105, the private key 114 and the public key 112 of a key pair 110 as contemporaneous inputs and a blob 335 as an output. Thus, in an embodiment the seed value is associated with the generated key(s) 816.

In an embodiment subsequent to its use the seed value is no longer maintained on the computing device, or is otherwise inaccessible outside the computing device's security context and/or the computing device 818.

In an embodiment the digested seed value, the blob, and when generated the second blob, are associated, or otherwise paired, as associated data 820.

In an embodiment the associated data is stored, or otherwise retained, in data storage, e.g., a cache, 822.

In an embodiment, and referring to FIG. 8B, at decision block 840 a determination is made as to whether the action determined to be performed at decision block 802 of FIG. 8A was a decryption of data. If yes, in an embodiment a generated cryptographic key is used to decrypt the encrypted data 842. In an aspect of this embodiment a generated private key 114 is used to decrypt the encrypted data 710.

In an embodiment subsequent to its use the cryptographic key(s) that currently exist in the security context, having been just generated or having been re-established for decryption, is (are) no longer maintained on the computing device, or are otherwise inaccessible outside the computing device's security context and/or the computing device 844.

In an embodiment the decrypted data is presented to, or otherwise made available to a user and/or is otherwise utilized as warranted 846. In an embodiment at decision block 802 of FIG. 8A a determination is again made as to whether there is an action to be performed.

If at decision block 840 of FIG. 8B it is determined that the action to be performed at decision block 802 of FIG. 8A was not a decryption of data then in an embodiment at decision block 850 a determination is made as to whether the action determined to be performed at decision block 802 of FIG. 8A was an encryption of data. If yes, in an embodiment a generated cryptographic key is used to encrypt data 852. In an aspect of this embodiment a generated public key 112 is used to encrypt data 730.

In an embodiment subsequent to its use the cryptographic key(s) that currently exist in the security context, having been just generated or having been re-established for encryption, is (are) no longer maintained on the computing device, or are otherwise inaccessible outside the computing device's security context and/or the computing device 854.

In an embodiment the encrypted data is transmitted, output, or otherwise utilized as warranted 856. In an embodiment at decision block 802 of FIG. 8A a determination is again made as to whether there is an action to be performed.

In FIG. 8B process block 415 initiates the process of identifying existing key(s) associated with a seed value as described with reference to FIG. 7. In an embodiment once the data cache 350 is searched and a stored digested seed value 354 is identified as a match to a digested seed value 325 then one or more cryptographic keys 110 associated with the seed value 105 used to generate the digested seed value 325 are reconstituted.

In an embodiment the stored key blob associated with the matched stored digested seed value is retrieved from the cache 828. In an aspect of this embodiment if the current action to be taken is decryption of data 710 then the stored key blob 356 associated with the matched stored digested seed value 354 is retrieved from the cache 350. In an aspect of this embodiment if the current action to be taken is encryption of data 730 and a stored second key blob 358 exists then the stored second key blob 358 associated with the matched stored seed value 354 is retrieved from the cache 350. In an aspect of this embodiment if the current action to be taken is encryption of data 730 and no stored second key blob 358 exists, e.g., the stored key blob 356 was generated from a seed value 105 and the public key 112 and the private key 114 of a key pair 110, then the stored key blob 356 associated with the matched stored seed value 354 is retrieved from the cache 350.

In an embodiment a KDF is executed to decrypt the retrieved key blob and thereby regenerate a cryptographic key 830. In an aspect of this embodiment the KDF-TWO 310 is executed with the seed value 105 and the retrieved key blob 335 or second key blob 345 as inputs to the KDF-TWO 130 in order to decrypt the previously encrypted cryptographic key 110.

In an aspect of this embodiment when the current action to be performed is decryption of data the KDF-TWO 130 is executed with the seed value 105 and the key blob 335 as inputs to the KDF-TWO 130, wherein the seed value 105 is utilized to decrypt the key blob 335 and the respective private key 114 is reconstituted or otherwise regenerated for use by the computing system to decrypt data 710.

In an aspect of this embodiment when the current action to be performed is encryption of data and a second key blob 345 was previously generated the KDF-TWO 130 is executed with the seed value 105 and the second key blob 345 as inputs to the KDF-TWO 130, wherein the seed value 105 is utilized to decrypt the second key blob 345 and the respective public key 112 is reconstituted or otherwise regenerated for use by the computing system 100 to encrypt data 730.

In an aspect of this embodiment when the current action to be performed is encryption of data and no second key blob 345 was generated the KDF-TWO 130 is executed with the seed value 105 and the key blob 335 as inputs to the KDF-TWO 130, wherein the seed value 105 is utilized to decrypt the key blob 335 and the respective public key 112 is reconstituted or otherwise regenerated for use by the computing system 100 to encrypt data 730.

In an embodiment subsequent to its use the seed value is no longer maintained on the computing device, or is otherwise inaccessible outside the computing device's security context and/or the computing device 832.

Figure 9:
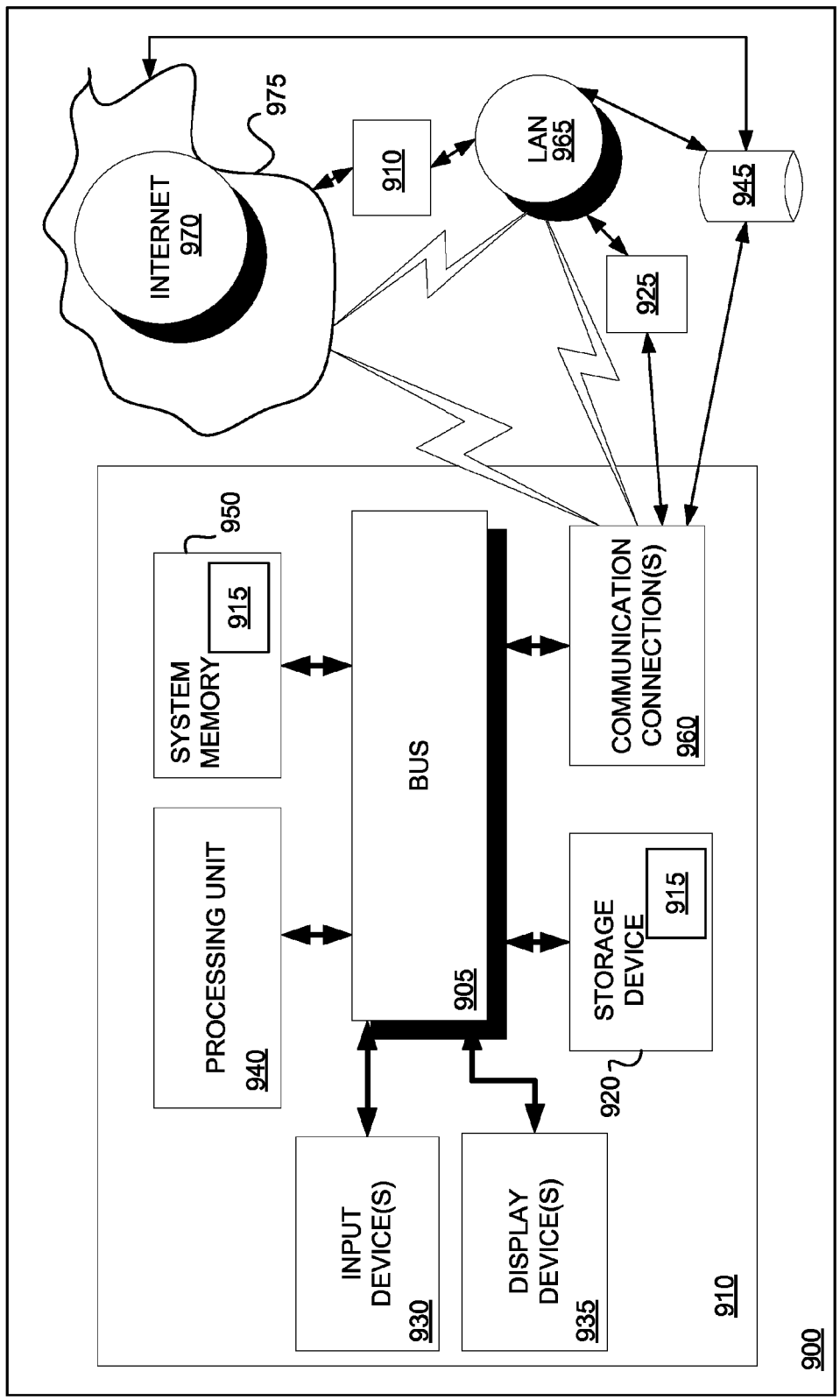

FIG. 9 is a block diagram that illustrates an exemplary computing device 910 upon which embodiment security contexts 125 can be implemented on and/or commanded from. Examples of computing devices 910 include, but are not limited to, servers, server systems, computers, e.g., desktop computers, computer laptops, also referred to herein as laptops, notebooks, netbooks, computing tablets, computer networks, etc., cell phones, cell phone networks, wearable computing devices, etc.

In an embodiment one or more computing devices 910 and/or other components, e.g., external hard drive(s) 925, external storage 945, communication systems, including but not limited to, the internet 970, etc., comprise a computing device system 900.

An embodiment computing device 910 includes a bus 905 or other mechanism for communicating information, and a processing unit 940, also referred to herein as a processor 940, coupled with the bus 905 for processing information. An embodiment computing device 910 also includes system memory 950, which may be volatile or dynamic, such as random access memory (RAM), non-volatile or static, such as read-only memory (ROM) or flash memory, or some combination of the two. In an embodiment the system memory 950 is coupled to the bus 905 for storing information and instructions 915 to be executed by the processing unit 940, and may also be used for storing temporary variables or other intermediate information during the execution of instructions 915 by the processor 940. The system memory 950 often contains an operating system and one or more programs, software procedures or applications, and/or software code, 915 and may also include program data 915.

In an embodiment a storage device 920, such as a magnetic or optical disk, solid state drive, flash drive, etc., is also coupled to the bus 905 for storing information, including program code of instructions 915 and/or data 915, e.g., volumes. In the embodiment computing device 910 the storage device 920 is computer readable storage 920 and/or machine readable storage 920.

Embodiment computing devices 910 generally include one or more display devices 935, such as, but not limited to, a display screen, e.g., a cathode ray tube (CRT) or liquid crystal display (LCD), a printer, a projector device for projecting information, and one or more speakers, for providing information to the computing device's system administrators and users 115. Embodiment computing devices 910 also generally include one or more input devices 930, such as, but not limited to, a keyboard, mouse, trackball, pen, voice input device(s), and touch input devices, which the system administrators and users 115 can utilize to communicate information and command selections to the processor 940. All of these devices 930 and 935 are known in the art and need not be discussed at length here.

In an embodiment the processor 940 executes one or more sequences of one or more programs, or applications, and/or software code instructions 915 resident in the system memory 950. In an embodiment these instructions 915 may be read into the system memory 950 from another computing device-readable medium, including, but not limited to, the storage device 920. In alternative embodiments hard-wired circuitry may be used in place of or in combination with software instructions 915. Embodiment computing device 910 environments are not limited to any specific combination of hardware circuitry and/or software.

The term "computing device-readable medium" as used herein refers to any medium that can participate in providing program, or application, and/or software instructions 915 to the processor 940 for execution. Such a medium may take many forms, including but not limited to, storage media and transmission media. Examples of storage media include, but are not limited to, RAM, ROM, EEPROM, flash memory, solid state drive, CD-ROM, USB stick drives, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 950 and storage device 920 of embodiment computing devices 910 and the external hard drive(s) 925 are further examples of storage media. Examples of transmission media include, but are not limited to, wired media such as, but not limited to, coaxial cable(s), copper wire and optical fiber, and wireless media such as, but not limited to, electrical signals, optic signals, acoustic signals, RF signals and infrared signals.

An embodiment computing device 910 also includes one or more communication connections 960 coupled to the bus 905. Embodiment communication connection(s) 960 provide a two-way data communication coupling from the computing device 910 to other computing devices 910 on a local area network (LAN) 965 and/or wide area network (WAN), including the world wide web, or internet, 970 and various other communication networks 975, e.g., SMS-based networks, telephone system networks, etc.

Examples of the communication connection(s) 960 include, but are not limited to, an integrated services digital network (ISDN) card, modem, LAN card, and any device capable of sending and receiving signals, e.g., electrical, electromagnetic, optical, acoustic, RF, infrared, etc.

Communications received by an embodiment computing device 910 can include program, or application, and/or software instructions and data 915. Instructions 915 received by an embodiment computing device 910 may be executed by the processor 940 as they are received, and/or stored in the storage device 920 or other non-volatile storage for later execution In an embodiment a method for cryptographic key processing within a security context of at least one computing device or computing device system includes obtaining a seed value, e.g., a number, and obtaining at least one asymmetric generated cryptographic key, also referred to herein as an initial cryptographic key, wherein the initial cryptographic key is generated when a first KDF (key derivation function) is executed, and wherein the initial cryptographic key is obtained upon an initial introduction of the seed value to the security context. In an embodiment the method for cryptographic key processing includes executing a second KDF utilizing the initial cryptographic key as an input and generating a blob (binary large object) as an output wherein the blob comprises an encryption of the initial cryptographic key. In an embodiment the method for cryptographic key processing includes executing a function to generate a digested seed value by utilizing the seed value as at least one input to the function, associating the digested seed value with the blob, and storing the digested seed value and the blob in a storage container in a manner wherein the digested seed value and the blob are associated in the storage container.

In an embodiment the method for cryptographic key processing further includes, prior to obtaining an asymmetric generated cryptographic key, utilizing a digested seed value to search the storage container for a match that is a stored digested seed value with the same value as the digested seed value used to search the storage container. In an embodiment the method for cryptographic key processing includes, prior to obtaining an asymmetric generated cryptographic key, retrieving from the storage container the blob associated with a stored digested seed value that is a match with the same value as the digested seed value used to search the storage container when there is a match stored digested seed value, and executing the second KDF using the seed value as an input to decrypt the blob and regenerate the initial cryptographic key.

In an embodiment the method for cryptographic key processing further includes utilizing the regenerated initial cryptographic key to decrypt encrypted data that is accessible to the computing device.

In an embodiment method for cryptographic key processing the first KDF utilizes an asymmetric key function that when executed generates the initial cryptographic key.

In an embodiment method for cryptographic key processing the second KDF utilizes a symmetric key function that when executed generates a blob.

In an embodiment method for cryptographic key processing the function executed to generate a digested seed value is a one-way function wherein the seed value will not be output upon execution of the one-way function with the digested seed value as an input to the one-way function.

In an embodiment method for cryptographic key processing a seed value is a random number that is made accessible to the security context of a computing device.

In an alternative embodiment method for cryptographic key processing of the seed value is a random number that is generated by the security context of a computing device.

In an embodiment a method for cryptographic key processing further includes obtaining at least a second asymmetric generated cryptographic key, also referred to herein as a second cryptographic key, wherein the second cryptographic key is generated when the first KDF is executed, wherein the second cryptographic key is obtained upon an initial introduction of the seed value to the security context of at least one computing device, and wherein the initial cryptographic key and the second cryptographic key are generated contemporaneously upon an execution of the first KDF. In an embodiment the method for cryptographic key processing includes executing the second KDF utilizing the second cryptographic key as an input and outputting a blob wherein the blob is an encryption of the second cryptographic key. In an embodiment the method for cryptographic key processing includes, prior to obtaining an initial cryptographic key or a second cryptographic key, utilizing a digested seed value to search the storage container for a match that is a stored digested seed value with the same value as the digested seed value used to search the storage container. In an embodiment the method for cryptographic key processing includes, prior to obtaining an initial cryptographic key or a second cryptographic key, retrieving from the storage container the blob associated with a stored digested seed value that is a match with the same value as the digested seed value used to search the storage container when there is a match stored digested seed value, and executing the second KDF using the seed value as an input to decrypt the blob and regenerate the second cryptographic key.

In an embodiment a method for cryptographic key processing further includes utilizing the regenerated second cryptographic key to encrypt data that is accessible to the computing device.

In an embodiment method for cryptographic key processing the initial cryptographic key is a private key that is utilized for the decryption of encrypted data and the second cryptographic key is a public key that is utilized for the encryption of data.

In an embodiment method for cryptographic key processing the blob is the result of an encryption of the initial cryptographic key with the second cryptographic key utilizing the seed value.

In an alternative method for cryptographic key processing a blob that is the resultant encryption of the initial cryptographic key is a first blob and a second blob is the result of the encryption of the second cryptographic key, wherein the first blob and the second blob are different blobs with different values.

In an embodiment method for cryptographic key processing the blob is a resultant encryption of the initial cryptographic key utilizing the seed value.

In an embodiment a method for cryptographic key processing further includes creating at least one decoy digested seed value; creating at least one decoy cryptographic key with a format and a size that is representative of the initial cryptographic key, wherein the decoy cryptographic key has a value that is different than the initial cryptographic key; executing the second KDF utilizing the decoy cryptographic key as an input with a decoy blob as an output, wherein the decoy blob is an encryption of the decoy cryptographic key; associating the decoy digested seed value with the decoy blob; and storing the decoy digested seed value and the decoy blob in the storage container in a manner wherein the decoy digested seed value and the decoy blob are associated in the storage container.

In an embodiment a method for cryptographic key effectuation within a hybrid security context of at least one computing device system that has a storage container includes obtaining a seed value, e.g., a number, and executing a function to generate a digested seed value utilizing the seed value as at least one input to the function. In an embodiment the method for cryptographic key effectuation within a hybrid security context includes utilizing the digested seed value to search the storage container for a match that is a stored digested seed value with the same value as the digested seed value used to search the storage container, wherein the storage container includes stored associated data, i.e., a digested seed value and at least one blob (binary large object). In an embodiment the method for cryptographic key effectuation within a hybrid security context includes retrieving from the storage container the blob associated with the stored digested seed value that is a match when there exists a stored digested seed value with the same value as the digested seed value used to search the storage container. In an embodiment the method for cryptographic key effectuation within a hybrid security context includes executing a cryptographic encapsulation KDF (key derivation function) utilizing a seed value as an input to decrypt the retrieved blob and outputting a regeneration of at least one cryptographic key that is a decryption cryptographic key that was previously generated and previously associated with the seed value.

Upon execution of the cryptographic encapsulation KDF and when there is data to be decrypted, in an embodiment the method for cryptographic key effectuation within a hybrid security context includes utilizing the decryption cryptographic key to decrypt data.

In an embodiment the method for cryptographic key effectuation within a hybrid security context includes obtaining at least one cryptographic key that is a decryption cryptographic key to be used to decrypt data, wherein the decryption cryptographic key is generated when a cryptographic production KDF is executed, and wherein the decryption cryptographic key is obtained upon an initial introduction of the seed value to the hybrid security context of a computing device system. In an embodiment the method for cryptographic key effectuation within a hybrid security context includes executing a cryptographic encapsulation KDF utilizing the decryption cryptographic key as an input and generating a blob as an output wherein the blob is an encryption of the decryption cryptographic key, associating a digested seed value with the blob to generate an associated data, and storing the digested seed value and the blob in the storage container in a manner wherein the digested seed value and the blob are associated in the storage container.

In an embodiment method for cryptographic key effectuation within a hybrid security context the cryptographic production KDF utilizes an asymmetric key function. In an embodiment method for cryptographic key effectuation within a hybrid security context the cryptographic encapsulation KDF utilizes a symmetric key function. In an embodiment method for cryptographic key effectuation within a hybrid security context the function executed to generate a digested seed value is a one-way function wherein the seed value will not be output upon execution of the one-way function with the digested seed value as an input to the one-way function.

In an embodiment computing device with a hybrid security context and the capability to execute software procedures, the computing device includes a storage container that has at least one entry that includes a digested seed value and a blob (binary large object), wherein the digested seed value and the blob are associated data. In an embodiment the computing device includes access to a seed value. In an embodiment the computing device includes a software procedure that has a one-way function that when executed by the computing device within the hybrid security context generates a digested seed value utilizing a seed value as at least one input to the one-way function. In an embodiment the computing device includes a software procedure that has a cryptographic encapsulation KDF (key derivation function) that is executed by the computing device within the hybrid security context. In an embodiment the cryptographic encapsulation KDF includes a seed value as an input to decrypt a blob retrieved from the storage container and an output that includes a regeneration of at least one cryptographic key that is a decryption cryptographic key that was previously generated. In an embodiment the computing device includes encrypted data that can be decrypted within the hybrid security context with at least a decryption cryptographic key that is regenerated upon the execution of the cryptographic encapsulation KDF. In an embodiment the computing device includes a software procedure that has a cryptographic key production KDF that when executed by the computing device within the hybrid security context includes the capability to generate at least one decryption cryptographic key that can be utilized by the computing device to decrypt data.

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for cryptographic key processing within a security context of at least one computing device, the method comprising:
  obtaining a seed value comprising a number;
  obtaining at least one generated cryptographic key comprising an initial cryptographic key wherein the initial cryptographic key is generated when a first KDF (key derivation function) is executed, and wherein the initial cryptographic key is obtained upon an initial introduction of the seed value to the security context of at least one computing device;
  executing a second KDF comprising the initial cryptographic key as an input and a blob (binary large object) as an output wherein the blob comprises an encryption of the initial cryptographic key,
    a designated KDF being the first KDF or the second KDF, the designated KDF utilizing an asymmetric key function,
    a specified KDF being the first KDF or the second KDF that is not the designated KDF, the specified KDF utilizing a symmetric key function;
  executing a function to generate a digested seed value utilizing the seed value as at least one input to the function;
  associating the digested seed value with the blob; and
  storing the digested seed value and the blob in a storage container in a manner wherein the digested seed value and the blob are associated in the storage container.

2. The method for cryptographic key processing of claim 1, further comprising:
  utilizing the digested seed value to search the storage container for a match comprising a stored digested seed value with the same value as the digested seed value used to search the storage container prior to obtaining the at least one generated cryptographic key;
  retrieving from the storage container the blob associated with the stored digested seed value comprising a match when there exists a stored digested seed value stored in the storage container with the same value as the digested seed value used to search the storage container prior to obtaining the at least one generated cryptographic key; and
  executing the second KDF comprising the seed value as an input to decrypt the blob and regenerate the initial cryptographic key.

3. The method for cryptographic key processing of claim 2, further comprising utilizing the regenerated initial cryptographic key to decrypt encrypted data accessible to the at least one computing device.

4. The method for cryptographic key processing of claim 1, wherein the first KDF utilizes the asymmetric key function that when executed generates the initial cryptographic key; and
  wherein the second KDF utilizes the symmetric key function that when executed generates the blob.

5. The method for cryptographic key processing of claim 1, wherein the function executed to generate a digested seed value comprises a one-way function wherein the seed value will not be output upon execution of the one-way function with the digested seed value as an input to the one-way function.

6. The method for cryptographic key processing of claim 1, wherein the seed value comprises a random number that is made accessible to the security context of a computing device.

7. The method for cryptographic key processing of claim 1, wherein the seed value comprises a random number that is generated by the security context of a computing device.

8. The method for cryptographic key processing of claim 1, further comprising:
  obtaining at least a second generated cryptographic key comprising a second cryptographic key wherein the second cryptographic key is generated when the first KDF is executed, wherein the second cryptographic key is obtained upon an initial introduction of the seed value to the security context of at least one computing device, and wherein the initial cryptographic key and the second cryptographic key are generated contemporaneously upon an execution of the first KDF;
  executing the second KDF comprising the second cryptographic key as an input and a blob as an output wherein the blob comprises an encryption of the second cryptographic key;
  utilizing the digested seed value to search the storage container for a match comprising a stored digested seed value with the same value as the digested seed value used to search the storage container prior to obtaining the initial cryptographic key and prior to obtaining the second cryptographic key;

retrieving from the storage container the blob associated with the stored digested seed value comprising a match when there exists a stored digested seed value stored in the storage container with the same value as the digested seed value used to search the storage container prior to obtaining the initial cryptographic key and prior to obtaining the second cryptographic key; and executing the second KDF comprising the seed value as an input to decrypt the blob and regenerate the second cryptographic key.

9. The method for cryptographic key processing of claim 8, further comprising utilizing the regenerated second cryptographic key to encrypt data accessible to the at least one computing device.

10. The method for cryptographic key processing of claim 9, wherein the initial cryptographic key comprises a private key utilized for the decryption of encrypted data and wherein the second cryptographic key comprises a public key utilized for the encryption of data.

11. The method for cryptographic key processing of claim 8, wherein the blob comprises an encryption of the initial cryptographic key with the second cryptographic key utilizing the seed value.

12. The method for cryptographic key processing of claim 8, wherein the blob comprising the encryption of the initial cryptographic key is a first blob and the blob comprising the encryption of the second cryptographic key is a second blob and the first blob and the second blob are different blobs.

13. The method for cryptographic key processing of claim 1, wherein the blob comprises an encryption of the initial cryptographic key utilizing the seed value.

14. The method for cryptographic key processing of claim 1, further comprising:
creating at least one decoy digested seed value;
creating at least one decoy cryptographic key that comprises a format and a size that is representative of the initial cryptographic key and wherein the decoy cryptographic key comprises a value that is different than the initial cryptographic key;
executing the second KDF comprising the decoy cryptographic key as an input and a decoy blob as an output wherein the decoy blob comprises an encryption of the decoy cryptographic key;
associating the decoy digested seed value with the decoy blob; and
storing the decoy digested seed value and the decoy blob in the storage container in a manner wherein the decoy digested seed value and the decoy blob are associated in the storage container.

15. A method for cryptographic key effectuation within a hybrid security context of at least one computing device system comprising a storage container, the method comprising:
obtaining a seed value comprising a number;
executing a function to generate a digested seed value utilizing the seed value as at least one input to the function;
utilizing the digested seed value to search the storage container of at least one computing device system for a match comprising a stored digested seed value with the same value as the digested seed value used to search the storage container, wherein the storage container comprises stored associated data comprising a digested seed value and at least one blob (binary large object);

retrieving from the storage container the blob associated with the stored digested seed value comprising a match when there exists a stored digested seed value stored in the storage container with the same value as the digested seed value used to search the storage container;

executing a cryptographic encapsulation KDF (key derivation function) comprising the seed value as an input to decrypt the retrieved blob, wherein the output of the cryptographic encapsulation KDF comprises a regeneration of at least one cryptographic key comprising a decryption cryptographic key that was previously generated;

upon execution of the cryptographic encapsulation KDF and when there is data to be decrypted, utilizing the decryption cryptographic key to decrypt the data to be decrypted;

obtaining at least one cryptographic key comprising a decryption cryptographic key to be used to decrypt data wherein the decryption cryptographic key is generated when a cryptographic production KDF is executed, and wherein the decryption cryptographic key is obtained upon an initial introduction of the seed value to the hybrid security context of a computing system;

executing the cryptographic encapsulation KDF comprising the decryption cryptographic key as an input and a blob as an output wherein the blob comprises an encryption of the decryption cryptographic key,
a designated KDF being the cryptographic production KDF or the cryptographic encapsulation KDF, the designated KDF utilizing an asymmetric key function,
a specified KDF being the cryptographic production KDF or the cryptographic encapsulation KDF that is not the designated KDF, the specified KDF utilizing a symmetric key function;

associating the digested seed value with the blob wherein the association comprises associated data; and storing the digested seed value and the blob in the storage container in a manner wherein the digested seed value and the blob are associated in the storage container.

16. The method for cryptographic key effectuation within a hybrid security context of claim 15, wherein the cryptographic production KDF utilizes the asymmetric key function; and
wherein the cryptographic encapsulation KDF utilizes the symmetric key function.

17. The method for cryptographic key effectuation within a hybrid security context of claim 15, wherein the function executed to generate a digested seed value comprises a one-way function wherein the seed value will not be output upon execution of the one-way function with the digested seed value as an input to the one-way function.

18. A computing system comprising a hybrid security context and at least one computing device comprising the capability to execute software procedures, the computing system comprising:
a storage container comprising at least one entry comprising a digested seed value and a blob (binary large object), wherein the digested seed value and the blob of an entry of the storage container comprise associated data;
access to a seed value;
a software procedure comprising a one-way function that when executed by the at least one computing device within the hybrid security context generates a digested seed value utilizing a seed value as at least one input to the one-way function;

a software procedure comprising a cryptographic encapsulation KDF (key derivation function) executed by the at least one computing device within the hybrid security context wherein the cryptographic encapsulation KDF comprises a seed value as an input to decrypt a blob retrieved from the storage container and wherein the output of the cryptographic encapsulation KDF comprises a regeneration of at least one cryptographic key comprising a decryption cryptographic key that was used to create the blob, the blob including an encryption of the decryption cryptographic key;

encrypted data that can be decrypted within the hybrid security context with at least one cryptographic key comprising a decryption cryptographic key that is regenerated upon the execution of the cryptographic encapsulation KDF; and a software procedure comprising a cryptographic key production KDF that when executed by the at least one computing device within the hybrid security context comprises the capability to generate at least one decryption cryptographic key that can be utilized by the at least one computing device to decrypt data, a designated KDF being the cryptographic key production KDF or the cryptographic encapsulation KDF, the designated KDF utilizing an asymmetric key function, a specified KDF being the cryptographic key production KDF or the cryptographic encapsulation KDF that is not the designated KDF, the specified KDF utilizing a symmetric key function.

19. The computing system of claim 18, wherein the cryptographic key production KDF utilizes the asymmetric key function; and wherein the cryptographic encapsulation KDF utilizes the symmetric key function.

20. The computing system of claim 18, wherein the one-way function is a one-way hash function that is configured to not output the seed value upon execution of the one-way hash function with the digested seed value as an input to the one-way hash function.

* * * * *